Sept. 25, 1956 J. E. BOTTOMS 2,764,059
AUTOMATIC PROJECTION PRINTER
Filed April 6, 1953 4 Sheets-Sheet 1
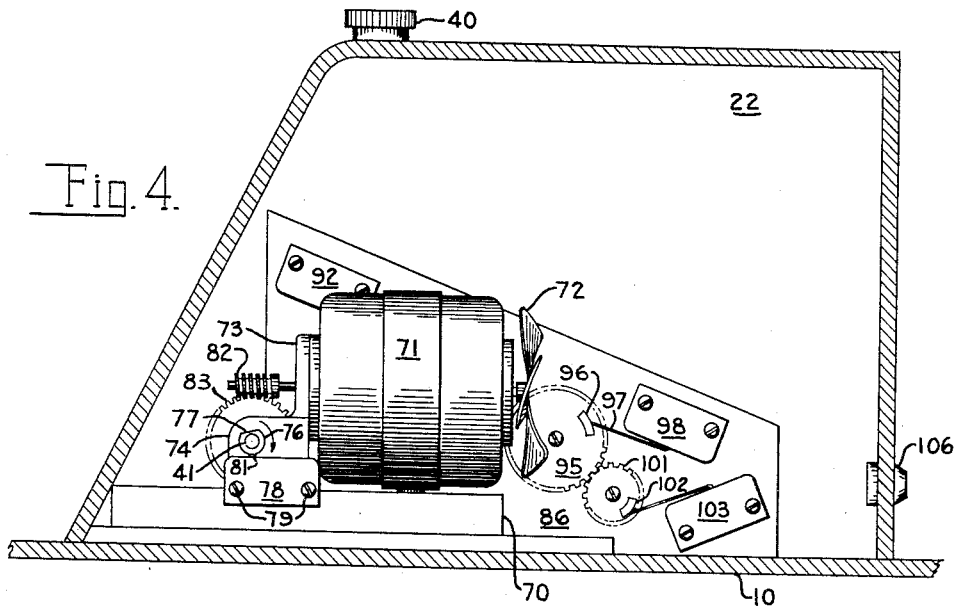
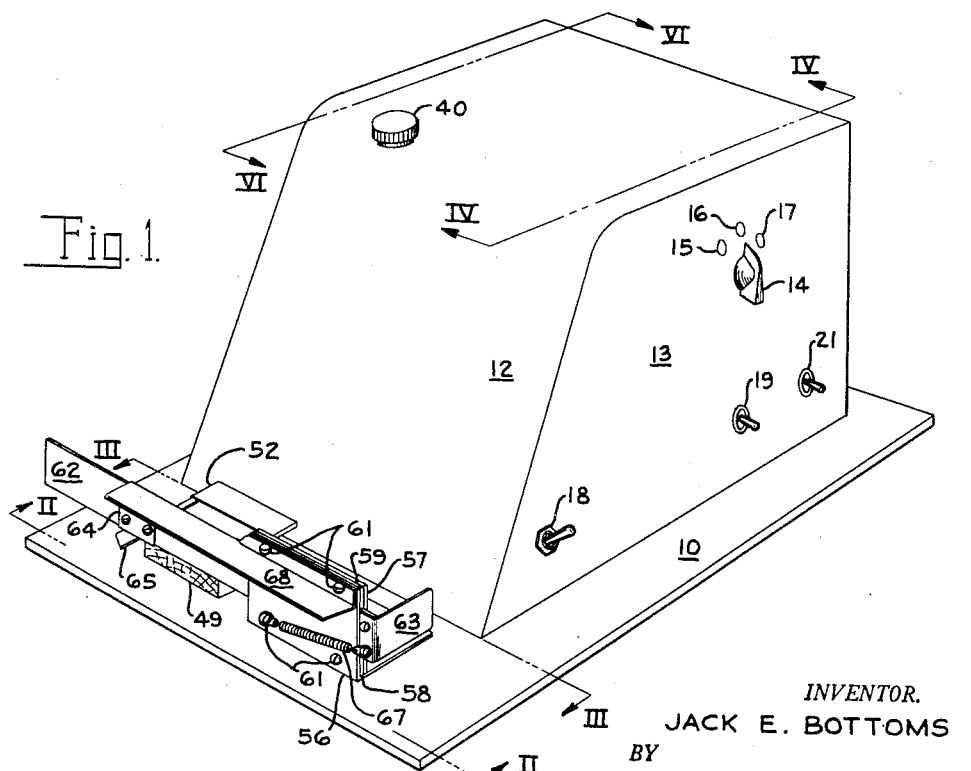
INVENTOR.
JACK E. BOTTOMS
BY Maurice A. Weikart
ATTORNEY Sept. 25, 1956     J. E. BOTTOMS     2,764,059
AUTOMATIC PROJECTION PRINTER
Filed April 6, 1953     4 Sheets-Sheet 3

INVENTOR.
JACK E. BOTTOMS
BY Maurice A. Weikart
ATTORNEY

Sept. 25, 1956     J. E. BOTTOMS     2,764,059
AUTOMATIC PROJECTION PRINTER

Filed April 6, 1953     4 Sheets-Sheet 4

INVENTOR.
JACK E. BOTTOMS
BY
Maurice A. Weikart
ATTORNEY

United States Patent Office 2,764,059
Patented Sept. 25, 1956

2,764,059

AUTOMATIC PROJECTION PRINTER

Jack E. Bottoms, Hartford, Wis.

Application April 6, 1953, Serial No. 347,004

4 Claims. (Cl. 88—24)

This invention relates generally to photographic printing and in particular to means for automatically positioning successive areas of sensitized paper in proper position relative to a photographic enlarger and synchronizing the energization of the enlarger with the automatic positioning means.

An object of the present invention is to provide automatic projection printing apparatus which positively synchronizes the energization of a photographic enlarger with the feeding of sensitized paper into proper printing position for a predetermined number of printing cycles.

A further object is to provide means for adjustably varying the number of automatic printing cycles according to the number of prints desired.

A further object is to provide an automatic projection printer in which the width of the prints may be adjustably varied as desired and the length of sensitized paper fed per printing cycle may also be adjustably varied, thus providing for both adjustable print widths and border widths.

A further object is to provide means for manually cutting the strip of prints at the completion of the predetermined number of printing cycles.

A further object is to provide means for preventing random reflection of light from the strip-cutting apparatus to the exposed print.

These and other objects will become apparent from the description which follows, the invention being defined by the appended claims.

Fig. 1 is a perspective view of the printer with the cover panels in place and showing the manual cutting apparatus.

Fig. 4 is a view taken along the line IV—IV of Fig. 1 showing the timing mechanism and the drive for the sensitized paper feeding mechanism.

Figure 2:
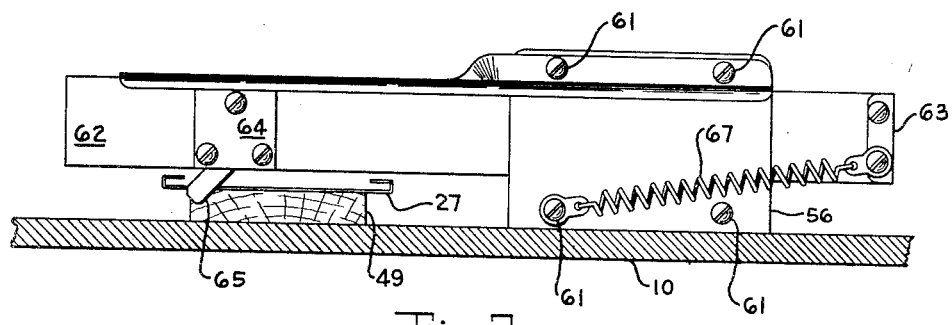
Fig. 2 is a partial sectional view taken generally along the lines II—II of Fig. 1 showing in detail the manual cutting apparatus.

Referring now to Fig. 1, it may be seen that the printer is constructed with a base 10, top cover 12 and side panels 13 (only one of which is visible in Fig. 1). A knob 14 is accessible at the side panel 13 and cooperates with three position indicia 15, 16, and 17 and serves to operate a multiple position switch for selection of the number of printing cycles, as will subsequently be pointed out. Manual switches 18, 19, and 21 are also accessible at panel 13, their function being subsequently explained with reference to Fig. 7.

Figure 6:
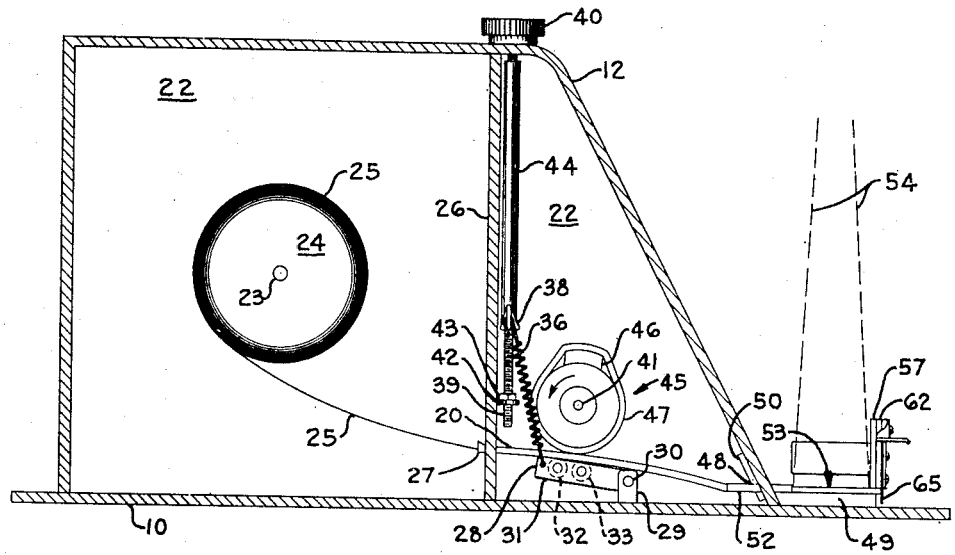
Fig. 6 is a view taken generally along the line VI—VI of Fig. 1 showing the adjustable sensitized paper feeding means, the path of the sensitized paper strip to the printing area, light from the enlarger (not shown) indicating the printing area.

Referring now to Fig. 6, interiorly the printer casing is divided lengthwise by a panel 22 extending the entire length of the casing. Mounted centrally on panel 22 is a stub shaft 23, upon which is freely rotatable a spool 24 which carries a roll of sensitized paper 25. A vertical panel 26 has a slot 20 therein, through which extends a somewhat flexible guide member or channel 27 (which may be formed of light gauge sheet aluminum) corresponding in width to the width of the sensitized paper 25 (channel 27 is shown in profile in Fig. 2). Pivotally mounted on a bracket 29, by means of pin 30, is a roller-carrying bracket 31, having identical upstanding flanges 28, only one of which is visible in Fig. 6. Rollers 32 and 33 are freely rotatable on pins which are supported in the bracket 31. Two tension springs 36 (only one of which is visible in Fig. 6) are hooked into the flanges 28 and secured to a wingnut 38, which is freely threaded on an elongated adjusting screw 39. Screw 39 has a manually rotatable head 40, accessible from outside the panel 12 and extends through a retaining eyelet 42 extending from the panel 26. A member 43 is non-rotatably secured to the screw 39 and serves as a bearing surface against the eyelet 42 for supporting the screw 39. A tube 44 extends between the wing nut 38 and the underside of top panel 12. The tube 44 serves to define an upper limiting position for wing nut 38 as it is moved upwardly on screw 39 by manual adjustment of the head 40. It may thus be seen that the tension of springs 36 may be varied by manually rotating the head 40 of screw 39.

On a drive shaft 41 is mounted a paper advancing cam 45, having a single lobe 46, the cam 45 and lobe 46, having a flexible traction band 47 extending around the cam and lobe. The traction band 47 is made of material having a relatively high coefficient of sliding friction, such as medium soft rubber. Guide channel 27 extends slightly downwardly from the slot 20 and passes between the rollers 31 and 32 and the cam 45, and thence through a slot 48 in the lower portion of panel 12. A slotted piece 50 of light-blocking material, such as black felt, is secured to the inner face of panel 12 adjacent the slot 48, and serves to block any light which might be reflected through the slot from outside the printer casing. A supporting block 49 supports the outer end of the channel 27.

It will be apparent that the downward bend given the channel 27 causes it to resist upward flexure by the rollers 32 and 33 through the upward force supplied by springs 36. Adjustment of knob 40 thus serves to vary the upward force exerted on channel 27 by rollers 31 and 32 and thereby adjusts the vertical position of the base portion of channel 27 with respect to cam 45. Since, as previously pointed out, the sensitized paper 25 slidably extends within the guide channel 27, it will be apparent that as cam 45 is rotated counterclockwise, each time lobe 46 approaches its low position its periphery will contact the upper face of the sensitized paper 25 and advance the paper strip within the channel an amount inversely proportional to the distance between channel 27 and the cam 45. It may thus be seen that the amplitude of the advance of paper 25, through the channel 27, with each rotation of cam 45 may be varied by adjusting the tension of springs 36 and therefore the upward flexure of guide channel 27 and consequently the vertical position of the base of channel 27 with respect to cam 45.

A light shielding member or cap 52, shaped similarly to channel 27, but having its web portion extending over the exposed upper face of channel 27 is slidable on the channel 27 and through the slot 48. This cap 52 shields from light that portion of the sensitized paper 25, within channel 27, which it overlies, and, thus, by positioning cap 52 the rear boundary of that portion, indicated generally at 53, of the sensitized paper which is exposed to light from the photographic enlarger (not shown) may be established. In Fig. 6 the light from the enlarger which serves to print the image is indicated by broken lines 54. It may thus be seen that by manually sliding the cap 52 along the channel 27, the cap's right-hand edge (as viewed in Fig. 6) will determine the width of the printed surface, and the amount of advance of the sensitized paper 25 within channel 27 with each revolution of cam 45 will determine the width of the border which will appear on each print.

Figure 3:
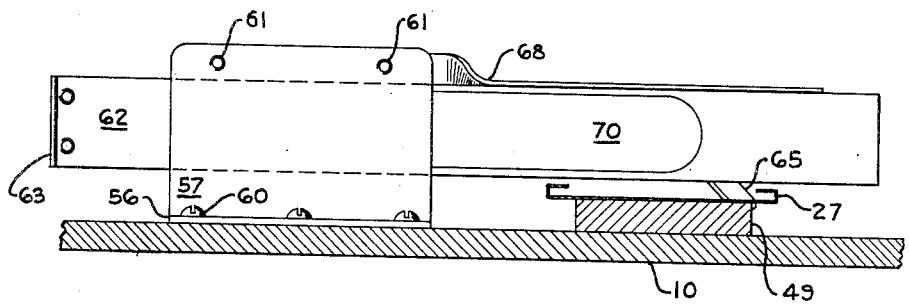
Fig. 3 is a partial sectional view taken along the line III—III of Fig. 1 showing the rear face of the cutting apparatus and showing in profile the printing area.

Referring now to Figs. 1, 2, and 3, the means for manually severing a strip of exposed prints will now be described. As may be seen in Fig. 1 the cutting means is located generally at the forward portion of the base 10 and is supported by means of an angle member 56 secured to the base 10 by screws 60 (Fig. 3). A back plate 57 and upper and lower spacer blocks 58 and 59 are secured to the vertical portion of member 56 by means of screws 61. Within the recess thus formed a bar 62 is freely slidable. Bar 61 has secured to its right-hand end (as viewed in Fig. 1) an L-shaped handle member 63 which extends horizontally rearward therefrom. A plate 64, secured to bar 62, rigidly clamps a cutting blade 65 in position. A tension spring 67 is connected between the bar 62 and the stationary member 56.

After the desired number of exposures have been made, the exposed strip may be cut off by grasping the handle member 63 and drawing it horizontally to the right (as viewed in Fig. 1) against the tension of spring 67. As shown in Fig. 2, this movement results in the blade 65 being drawn across the end face of channel 27, severing the exposed strip of prints. A shield strip 68 extends across and overlies the front face of the cutting apparatus, being mounted on member 56 by means of the upper pair of screws 61. This shield strip 68 serves to protect from exposure to reflected light the already exposed prints which have advanced beyond the front end of the channel 27.

As may best be seen in Fig. 3, the rear face of bar 62 has a recessed, milled-out portion 70 which is painted dead black. This blackened portion 70 serves to reduce the amount of random reflected light which might otherwise interfere with the correct printing of the sensitized paper which, when exposed to light from the photographic enlarger, is just adjacent this rear face of bar 62.

Figure 5:
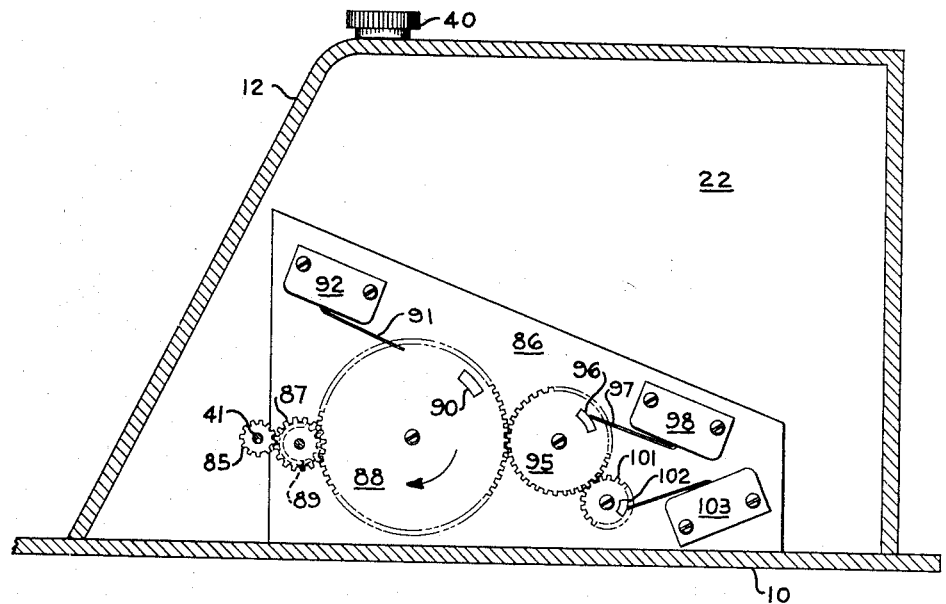
Fig. 5 is a view similar to Fig. 4 but with the drive motor and a portion of the gearing removed to better show the timing mechanism.

Referring now to Figs. 4 and 5, the selective timing mechanism will be described. Upon a block 70 secured to the base 10 is mounted a driving means namely a motor 71, having a cooling fan 72 secured to its shaft adjacent one of its ends. Mounted on the motor endplate opposite the cooling fan is bearing member 73 having two extending flanges 74 (only one of which is visible in Fig. 4). Flanges 74 serve to journal the drive shaft 41, which extends freely through the partitioning panel 22 and has secured to its end the cam 45 as previously pointed out with reference to Fig. 6. As may be seen in Fig. 4 the shaft 41 extends through its bearing members which are flanges 74 and has secured to its end an enlarger synchronizing cam 76 having a flat portion 77. Cam 76 cooperates with snap switch 78 mounted on block 70 by means of screws 79. Switch 78 is a totally enclosed snap switch which is of the normally open type which is well known in the art. Its actuator pin 81 is held depressed, and its contacts close, by the round portion of cam 76, but its contacts snap to open position when the flat portion 77 is opposite its pin 81.

Shaft 41 has mounted thereon a gear 83 which meshes with a worm gear 82 driven by the shaft of motor 71. Motor 71 drives through worm gear 82 and gear 83 to rotate cam 76 in a clockwise direction.

Referring now in particular to Fig. 5, it will be noted that shaft 41 also carries a gear 85, adjacent the panel 22. An irregularly shaped gear mounting plate 86 is rigidly secured by any suitable means to the panel 22, and has freely rotatably mounted thereon a gear 87 which is driven by the gear 85. In turn gear 87 by means of driving gear 89 drives a large timing cam or gear 88 which has mounted on its face a switch actuating dog 90, adapted to move the free end of an arm 91 upwardly. Arm 91 when so moved actuates inwardly the actuating button of the enclosed, normally closed timing switch 92, mounted on the plate 86. In the position shown in Fig. 5 arm 91 is in its lower position and switch 92 is in its normal, closed contact position.

Gear 88 drives a smaller timing cam or gear 95, also having mounted on its face a dog 96, adapted to move upwardly the free end of lever 97, thereby actuating a normally closed timing switch 98, identical with switch 92, into its open-contact position. Similarly, timing cam or gear 101 carries a dog 102 which actuates to opencontact position the normally closed timing switch 103. As shown in Fig. 5, both switches 98 and 103 are in their open-contact position.

Figure 7:
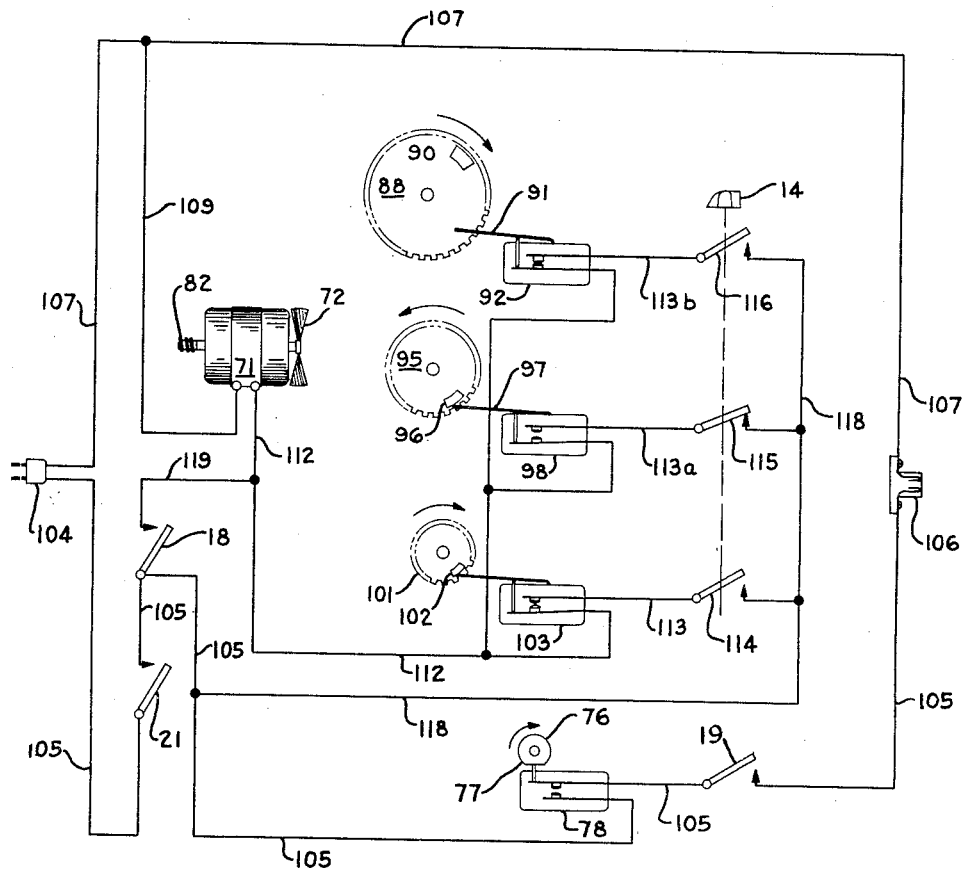
Fig. 7 is a schematic wiring diagram indicating the function of the various switches in the printer.

Referring now to Fig. 7, the electrical connections between the motor and switches will be described. Reference number 104 identifies a male connector plug which may be inserted into a conventional 110 volt outlet. Wire 105, forming one side of the power input, is connected to a manually operated power switch 21 (see Fig. 1 which indicates the physical location of switch 21 on the side panel 13) and thence to the switch 78, operated by cam 76. From switch 78, wire 105 is connected to a manually, operated enlarger controlling switch 19 (see Fig. 1 for location of this switch on side panel 13). From switch 19, wire 105 is connected to one side of a conventional female electrical outlet 106. Outlet 106 (also shown in Fig. 4) is adapted to receive the male two-prong connector from a conventional photographic enlarger.

Wire 107 connected to the other side of connector 104, and forming the other power input line, is connected to the second terminal on the enlarger connector 106.

Motor 71 is connected, through the various switches, in parallel to the connector 106. Wire 109, connected to wire 107, extends to one terminal of motor 71. A wire 112 is connected to the other terminal of motor 71 and extends to one side of each of the three switches 103, 98, and 92. The opposite side of switch 103 is connected by a wire 113 to one side of a switch 114. Switch 114 is one of a group of three switches, the other two being designated 115 and 116 respectively, which are operated by knob 14 (see Fig. 1). When knob 14 is opposite the index mark 15 (Fig. 1), switch 114 is closed and switches 115 and 116 are open. When knob 14 is opposite marking 16 (as shown in Fig. 1), switch 115 is closed and switches 114 and 116 are open, as shown in Fig. 7. When knob is opposite marking 17, switch 116 is closed and switches 114 and 115 are open. Switches 98 and 92 are connected to switches 115 and 116 respectively by wires 113a and 113b. The opposite side of each of switches 114, 115, and 116 is connected by wire 118 back to the other side of the line (i. e., to wire 105).

A wire 119 and a starter switch 18 (shown also in Fig. 1) serve to shunt out switches 114, 115, and 116 when switch 18 is closed, serving to connect motor 71 directly across the power input. Switch 18 is of the type which is spring loaded to open position and must be manually held in closed position.

*Operation*

Referring particularly to Figs. 6 and 7, the operation of the apparatus previously described will now be set out. With the parts in the position shown in Fig. 7, if power is applied to the wires 105 and 107, motor 71 will not be energized, since power switch 21 is open. If switch 21 is manually closed, motor 71 will still remain deenergized because switch 98 is open (this because the dog 96 on gear 95 is resting on lever 97 and thereby holding switch 98 open). Now, however, if starter switch 18 is momentarily held closed, manually, switch 98 will be shunted and motor 71 will be energized. As soon as it has rotated gear 95 sufficiently to remove dog 96 from contact with lever 97, switch 98 will close completing a parallel circuit to motor 71, and starter switch 18 may be released to open position. Switches 103 and 92 are also in closed position, but since, in the illustrated position of knob 14, the switches 114 and 116 are open, operation of switches 103 and 92 may be ignored. As shaft 41 is rotated by motor 71, the flat portion 77 of cam 76 approaches the actuating pin of switch 78, and the lobe 46 of cam 45 approaches the surface of the sensitized paper 25 within the guide channel 27 (Fig. 6). As flat portion 77 on cam 76 rotates to a position allowing switch 78 to open (thereby deenergizing the light source in the photographic enlarger), lobe 46 of cam 45 contacts the surface of the sensitized paper 25 and advances it out into the area 53 (Fig. 6) where it will be ready to receive light from the enlarger when it is again energized. As this forward impulse given the paper 25 by cam 45 is completed, flat 77 on cam 76 will have traversed past the actuating pin of switch 78, permitting switch 78 to reclose and again energizing the light source in the enlarger. The portion of sensitized paper just advanced into area 53 (Fig. 6) will be exposed to this light until cams 76 and 45 have been rotated sufficiently to against deenergize the light source in the enlarger and again advance an unexposed portion of sensitized paper into the exposure area 53. This alternate exposure and advancing of the sensitized paper will continue until gear 95 has rotated 360° and again brought dog 96 into contact with lever 97 to open switch 98 and again deenergize motor 71.

Gear 95 may be sized so that in making one revolution, cams 76 and 45 make seven revolutions. Thus with knob 14 in the position shown, seven prints will be made automatically and the printer will thereupon deenergize itself. Cam 88 may be so sized as to make one revolution to twelve revolutions of cams 76 and 45, so that with knob 14 opposite index 17, closing switch 116 and opening switches 114 and 115, the printer will make twelve prints automatically and then deenergize itself. Similarly cam 101 may be so sized as to make one revolution to three revolutions for cams 76 and 45, so that with knob 14 opposite index 15, closing switch 114, three prints will automatically be made and the printer will then deenergize itself.

When the required number of prints have been made, the cutting apparatus, described with reference to Figs. 2 and 3 may be manually actuated to sever the strip of exposed prints.

To compose pictures on the printer with enlarger switch 19 in closed position, power switch 21 is manually closed, thereby energizing the source of light in the enlarger. By manipulating the photographic enlarger the picture image may be focused on the surface of the sensitized paper in area 53 (Fig. 6) and the picture width adjusted by positioning member 52, the border width being adjusted by means of head 40. With composition of the picture completed, the knob 14 may be positioned so as to give the desired number of prints. To start the printing operation, the starter switch 18 is momentarily actuated to closed position and the operation of the printer proceeds automatically as previously pointed out.

From the foregoing, it will be noted that the apparatus described greatly reduces the time and effort necessary to produce multiple prints of pictures, such as school pictures, where multiple prints of each of many individual pictures are required. Since the operation is automatic, once the picture is properly composed, each print is uniformly printed with a minimum of attention from the operator.

The invention having thus been described, what is claimed is:

1. An automatic photographic printing device of the type which synchronizes energization of a photographic enlarger with the feed of sensitized paper into a printing area comprising: driving means; means for intermittently energizing a photographic enlarger; timing means for determining the number of energizations of the photographic enlarger; and means for advancing a strip of sensitized paper into a printing area comprising, a semi-flexible guide member through which said paper strip is advanced, a paper advancing rotatable driving element overlying said paper within said guide member, said element being rotated by said driving means and contacting the surface of said paper strip for a portion of each revolution of the element to impart a paper advancing impulse to said paper strip, a bracket carrying dual rollers pivotally mounted beneath said guide member, said rollers being adapted to contact the underside of said guide member, a tension spring urging said rollers into contact with the underside of said guide member to provide a variable separation between said driving element and said guide member, and means for manually adjusting the force exerted by said tension spring on said rollers to vary said separation.

2. An automatic photographic printing device of the type which synchronizes energization of a photographic enlarger with the feed of sensitized paper into a printing area comprising: driving means; means for intermittently energizing a photographic enlarger; timing means for determining the number of energizations of the photographic enlarger; and means for advancing a strip of sensitized paper into a printing area comprising, a semi-flexible guide member through which said paper strip is advanced, said guide member extending across the printing area, a paper advancing rotatable driving element overlying said paper within said guide member, said element being rotated by said driving means and contacting the surface of said paper strip for a portion of each revolution of the element to impart a paper advancing impulse to said paper strip, said paper advancing impulse moving an exposed portion of said paper strip into the printing area, a movable light shielding member mounted on said guide member adjacent the printing area, a bracket carrying a roller pivotally mounted beneath said guide member opposite said cam, said roller being adapted to contact the underside of said guide member, an adjustable tension spring urging said roller into contact with the underside of said guide member to provide a variable separation between said driving element and said guide member, said light shielding member being movable on said guide member to determine the amount of said paper strip exposed in the printing area.

3. An automatic photographic printing device of the type which synchronizes energization of a photographic enlarger with the feed of sensitized paper into a printing area comprising: driving means; means for intermittently energizing a photographic enlarger; timing means for determining the number of energizations of the photographic enlarger; and means for advancing a strip of sensitized paper into a printing area comprising, a semi-flexible guide member through which said paper strip is advanced, said guide member extending across the printing area, a paper advancing rotatable driving element overlying said paper within said guide member, said element being rotated by said driving means and contacting the surface of said paper strip for a portion of each revolution of the element to impart a paper advancing impulse to said paper strip, said paper advancing impulse moving an exposed portion of said paper strip into the printing area, a movable light shielding member mounted on said guide member adjacent the printing area, a bracket carrying a roller pivotally mounted beneath said guide member opposite said cam, said roller being adapted to contact the underside of said guide member, a tension spring urging said roller into contact with the underside of said guide member, said light shielding member being movable on said guide member to determine the amount of said paper strip exposed in the printing area, and means for manually adjusting the force exerted by said tension spring on said roller to thereby adjust the amplitude of the paper advancing impulse by varying said separation between said driving element and said guide member.

4. An automatic photographic printing device of the type which synchronizes energization of a photographic enlarger with the feed of sensitized paper into a printing area comprising: driving means; means for intermittently energizing a photographic enlarger; timing means for determining the number of energizations of the photographic enlarger; and means for advancing a strip of sensitized paper into a printing area comprising, a semi-flexible guide member through which said paper strip is advanced, said guide member extending across the printing area, a paper advancing rotatable driving element overlying said paper within said guide member, said element being rotated by said driving means and contacting the surface of said paper strip for a portion of each revolution of the element to impart a paper advancing impulse to said paper strip, said paper advancing impulse moving an exposed portion of said paper strip into the printing area, a movable light shielding member mounted on said guide member adjacent the printing area, a bracket carrying a roller pivotally mounted beneath said guide member opposite said driving element, said roller being adapted to contact the underside of said guide member, an adjustable tension spring urging said roller into contact with the underside of said guide member to provide a variable separation between said driving element and said guide member, said light shielding means defining one boundary of the exposed portion of said paper strip in said printing area, and paper strip severing means forming the opposite boundary of said exposed portion.

References Cited in the file of this patent

UNITED STATES PATENTS

| | | |
|---|---|---|
| 636,717 | Casler | Nov. 7, 1899 |
| 2,125,388 | Monroe | Aug. 2, 1938 |
| 2,240,938 | McNaney | May 6, 1941 |
| 2,258,098 | Neltner | Oct. 7, 1941 |
| 2,592,735 | Pirmov | Apr. 15, 1952 |
| 2,616,331 | Pavelle | Nov. 4, 1952 |